INVENTOR.
THURMAN W. CARVER

United States Patent Office 3,222,926
Patented Dec. 14, 1965

3,222,926
AIR MASS RELATIVE MOTION METER
Thurman W. Carver, Wichita, Kans., assignor to The Boeing Company, Seattle, Wash., a corporation of Delaware
Filed July 10, 1961, Ser. No. 123,005
12 Claims. (Cl. 73—180)

This invention relates to aircraft instruments for measuring a factor or factors in air mass relative motion; and more specifically provides acoustic type instruments for measuring yaw angle, angle of attack and, if desired, true airspeed (i.e., in the direction of relative motion). The invention is herein illustratively described by reference to the presently preferred embodiment thereof; however, it will be recognized that certain modifications and changes therein with respect to details may be made without departing from the underlying essentials involved.

A broad object of this invention is to provide aircraft instrument apparatus of the described type applicable to aircraft. The invention is capable of measuring any and all of the above-mentioned factors of air mass relative motion at airspeeds either above or below Mach 1. Moreover, it is not limited to a narrow band of airspeeds but in any given installation is capable of measurements at air velocities ranging from a few knots to several times the speed of sound, and of doing so with high accuracy.

Moreover, a further object is to provide aircraft instrument apparatus of this type operable under all flight conditions in the atmosphere, including low-altitude and high-altitude flight, and flight under varying conditions of temperature, pressure and humidity. Furthermore, icing conditions present no particular problem, as they do with certain previous types of instruments.

A further object of the invention is such a device which will not impede nor interfere with the operation or design of aircraft, even those capable of flying at speeds several times the speed of sound, and which can be installed on such aircraft with little or no structural modification thereof.

A further object is to provide such a device having greater accuracy and wider range than conventional instruments currently used for measuring angle of attack, yaw angle and true airspeed. A related object is to achieve the results indicated without moving parts, such as moving vanes, and without necessity for reliance upon pressure measurements or the like such as pitot and static pressure orifices. Still another related object is to achieve these results in a system which is not any more critical in its installational tolerances than conventional systems if the latter are installed and operated with an attempt to achieve equal accuracy.

A further object is to provide apparatus capable of yielding substantially continuous readings or indications of the variables being measured.

A further object is to provide aircraft instrument apparatus for the described purposes which can be made both rugged and reliable without undue weight penalty and which will compare very favorably in cost with currently available mechanical devices for conducting the described measurements. In the case of aircraft that already contain central computing equipment, the apparatus of this invention has an economic advantage over previous (mechanical vane) systems inasmuch as certain of the existing components in the computing equipment may be used for present purposes also.

With the improved apparatus sonic energy, preferably at ultrasonic frequency, is emitted from a forwardly stationed transmitter element mounted in the undisturbed free airstream and directed generally rearwardly toward two (or more) sonic receiver elements also mounted in the same undisturbed airstream aft of the transmitter element and at predetermined distances from different sides of the base of the probe structure which carries the transmitter element. The apparatus includes timing means for measuring differential sonic propagation time from the transmitter element to the respective receiver elements, and means responsive to the timing apparatus for computing the desired factor or condition of air mass relative motion, such as yaw angle, angle of attack or true airspeed. Depending upon the orientation of the plane or planes containing the transmitting element and respective receiving elements, yaw angle, angle of attack or both may be measured by the apparatus. Sonic propagation time is the measured quantity and may be measured with great accuracy and because the conditions of measurement in all other respects are independent of airspeed or other flight conditions, except for one reference variable which is the speed of sound at the prevailing ambient temperature and which is readily and accurately determined by known means, the apparatus is extremely accurate and versatile in its operation.

The novel probe structure or sensing head which is mounted externally of the aircraft in order to support the transducer elements for transmission and reception of sonic energy preferably comprises an elongated central probe which carries a transmitter element consisting in its optimum design of two or more transmitting transducers mounted on respectively different sides of the forward tip of the probe and directed rearwardly toward two or more receiving transducers mounted on forwardly projecting side probes also in the undisturbed airstream and in desired measurement planes containing the respective transmitting transducers. Such a sensing head configuration lends itself to mounting on various forward portions of an aircraft without disturbing aircraft operation or requiring special structural adaptation.

In order to simplify the mathematical explanation of the operating principles of computer apparatus used with the invention it is assumed throughout in this description that flight speed (i.e. relative air speed) is sufficiently low that the transverse component of air mass relative motion is not a factor to be taken into account in the computer equations. In the speed range of about Mach 0.6, and lower, this assumption does not adversely affect the accuracy of the computations by more than a small fraction of a percent. However, as airspeed increases materially higher the computer function should take the transverse component into account in order to achieve desired accuracy. Mathematical analysis leading to suitable computer functions for this latter purpose will be readily apparent from the geometry of the physical elements of the probe structure and well known physical characteristics of sound propagation.

These and other features, objects and advantages of the invention will become more fully evident from the following description thereof by reference to the accompanying drawings.

FIGURE 3 is a simplified perspective illustrating typical suitable locations for the sensing head structure and further illustrating a preferred configuration for the latter.

Figure 1:
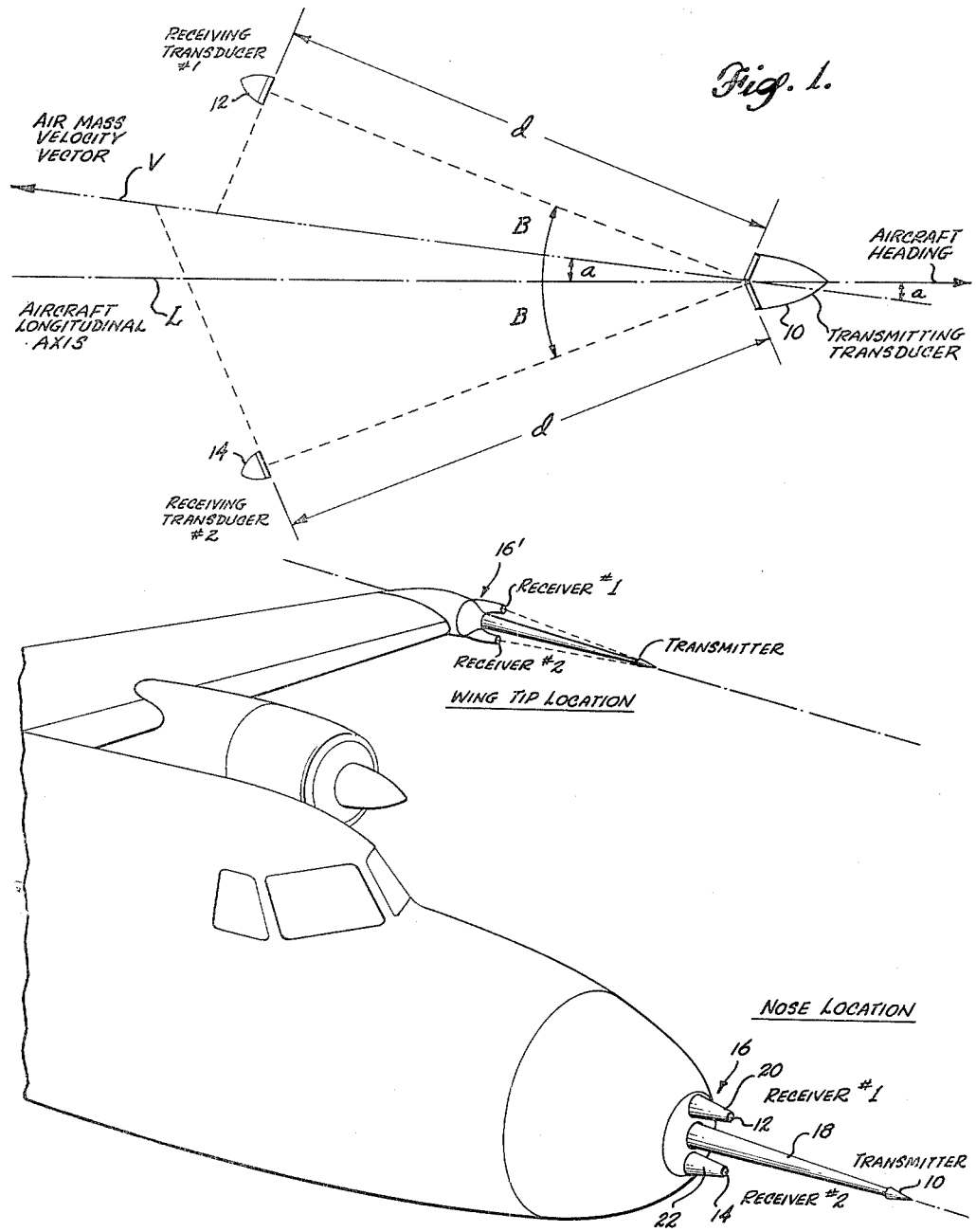
FIGURE 1 is a diagram illlustrating a suitable geometric relationship of transmitting and receiving elements to aircraft axis and air mass velocity.

Referring to the drawings, a sonic transmitting transducer 10 and two receiving transducers 12 and 14 are mounted on a probe structure, indicated generally by the reference numeral 16, which is situated forward of all aircraft aerodynamic surfaces and protrusions so that the transducers are exposed to the undisturbed air mass or free airstream. In the example, the probe structure 16 is shown mounted on the nose of an airplane A, although it will be evident that other locations may be chosen on the aircraft which will meet the requirements of transducer placement in the undisturbed air mass. For example, the sensor head could be mounted at a wing tip location such as indicated generally by the reference numeral 16' in FIGURE 3.

The transmitter element 10 is preferably mounted on the forward end of an elongated forwardly projecting probe structure 18 generally along an axis parallel to or, as shown, coincident with the airplane longitudinal axis L. The two illustrative receiving transducers 12 and 14 are respectively mounted on somewhat shorter elongated probes 20 and 22 which also project forwardly from the aircraft at locations spaced equally from respective opposite sides of the transmitter axis and also in the same undisturbed airstream as that incident upon the transmitter element 10. Preferably the receiving transducers are directional and the transmitting element comprises two transmitting transducers 10a and 10b which are directional and alinged directionally with the respective receiving transducers 12 and 14. The arrangement is such that the direct line of propagation from the transmitter 10 to each receiver 12 and 14 is inclined at an acute angle B in relation to the longitudinal axis L. In typical installations the angle B may be as small as five degrees or as great as thirty degrees, more or less, whereas the length of the propagation paths ($d$) typically will vary between three and five feet. There are optimum values for these quantities which are dependent upon performance characteristics of the aircraft. For aircraft operating at airspeeds above Mach 1, the angle B should be quite small. The variable relative air mass velocity vector V, in the example, is angled to one side of the longitudinal axis by a small acute angle $a$ which is, of course, subject to variation from zero to different values on either side of the axis. The purpose of the apparatus primarily is to measure the angle $a$, which, in the example, represents angle of attack, assuming the transmiting and receiving transducers to be contained in a common vertical plane, but it could also be yaw angle if the transducers were contained in a common horizontal or azimuth plane. It is basically essential that the transmitting transducer 10 be located well ahead of the receiving transducers 12 and 14 and that the angle B be small, especialy when airspeeds exceed Mach 1, inasmuch as the compressional wave energy emitted by the transmitter 10 would go undetected altogether if, as an extreme example, the transmitter were located even with or aft of the receiving transducers, since the emitted energy would never reach the latter. Accurate measurement, as previously indicated, is a matter of design in individual cases, which will insure that the quantities which must be measured and dealt with by the computer apparatus remain in a favorable and convenient range of variation. An excessively large or small value for B precludes this as does an excessively large or small value for $d$, for reasons which will be evident from the mathematical analysis outlined later herein.

As will be evident from an examination of FIGURE 1, for example, on the assumption stated hereinabove, the propagation time for an impulse of energy emitted by the transmitting transducer 10 over the propagation distance $d$ to each of the two receiving transducers 12 and 14 is determined by two variable factors: (1) the velocity of the propagation of sound in static air at the ambient temperature, and (2) the component of air mass velocity which lies along the direct line between the transmitting transducer and the particular receiving transducer. It will be evident that only when the velocity vector V lies along the axis L will the propagation time be equal along each of the two paths, indicating the condition of zero angle of attack, $a$. If the ambient static air sound propagation velocity is represented by the symbol $V_0$ and the air mass relative velocity by the symbol V, then the true propagation velocity $V_1$ between the transmitter 10 and receiver 12 is:

$$V_1 = V_0 + V \cos(B-a)$$

the quantities $a$ and B being those represented in the diagram. A similar expression for propagation velocity, $V_2$, between transmitter 10 and receiver 14 is derived as follows:

$$V_2 = V_0 + V \cos(B+a)$$

The respective transit times required for energy to traverse the distance between transmitter 10 and receivers 12 and 14 respectively are then:

$$T_1 = \frac{d}{V_0 + V \cos(B-a)}$$

$$T_2 = \frac{d}{V_0 + V \cos(B+a)}$$

Noting that $a$ and V are the variables to be measured whereas $V_0$ is a separately measured or known quantity, the above two transit time equations can be solved simultaneously to provide the expression:

$$\tan a = \frac{\Delta T \cdot d \text{ ctn } B}{T_1 d + T_2 d - 2 V_0 T_1 T_2}$$

where:

$$\Delta T = T_2 - T_1$$

By supplying to a computer the time difference $\Delta T$, also the progation times $T_1$ and $T_2$, and by feeding into the computer the value $V_0$, which is, of course, subject to variation from time to time under different atmospheric conditions, the value for angle of attack is readily computed and on the assumption stated above, wherein transverse component component of air mass relative motion can be ignored, will be highly accurate.

With the same assumption, the true airspeed quantity V may be also calculated from the same data, according to the following equation:

$$V = \frac{d \Delta T}{2 T_1 T_2 \sin a \sin B}$$

Figure 2:
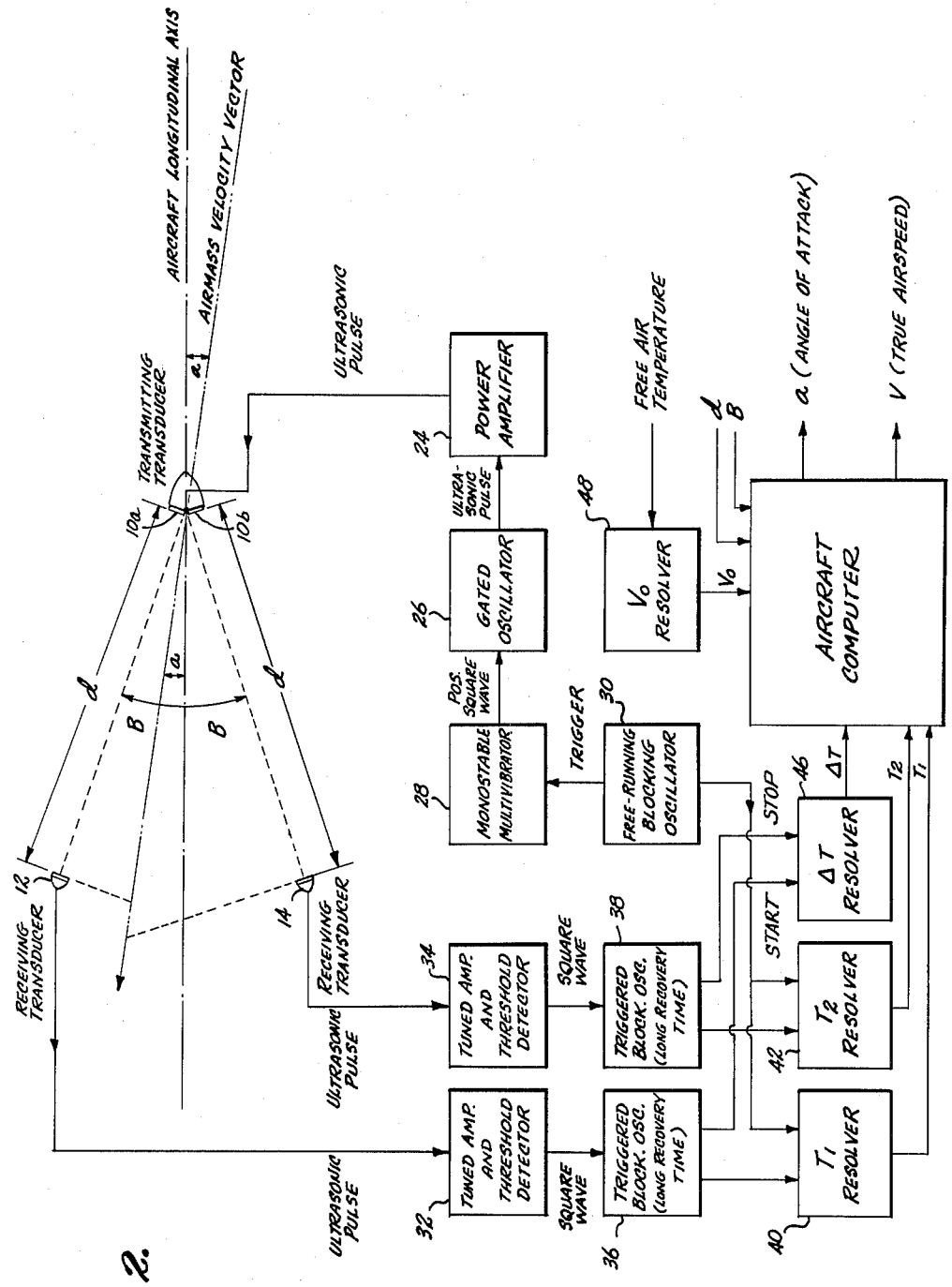
FIGURE 2 is a schematic diagram of a complete system for measuring both angle of attack, $a$, and true airspeed, $V$.

Referring to FIGURE 2, the transmitting element comprises the two transmitting transducers 10a and 10b driven in parallel by ultrasonic oscillation energy from a power amplifier 24 which amplifies the output of a gated oscillator 26 pulsed at a constant repetition rate by a trigger source comprising the monostable multivibrator 28. The latter, in turn, is triggered at the desired repetition rate by any suitable timing device, such as the free-running blocking oscillator 30. These components may be of conventional or other suitable form, as may the transmitting transducers 10a and 10b. The latter, for example, may comprise magnetostrictive, electromagnetic or piezoelectric elements, as may the receiving transducers.

Energy impulses detected by the receiving transducers 12 and 14 pass to the respective receiving circuits 32 and 34 which preferably include tuned amplifiers and threshold detectors operable to pass the detected video envelopes of the received impulses while rejecting lower-level noise signals. The detected envelopes passing the circuits 32 and 34 are applied to triggered blocking oscillators 36 and 38, respectively, which generate a sharp impulse with the inception of each impulse applied thereto. Preferably these circuits have long recovery time intervals which minimize the possibility of false triggering by noise signals while permitting the regular detected impulses at predetermined recurrence frequency to operate them. The recurrent sharp impulses delivered by the triggered circuit 36 are applied to a timing circuit 40 designated the $T_1$ resolver to which are also applied reference pulses from the free-running blocking oscillator 30. The $T_1$ resolver 40 produces an output current or voltage "$T_1$" proportional to the time lapse between each impulse from the timing oscillator 30 and the ensuing received impulse picked up by the receiving transducer 12. Similarly, the impulses from the triggered blocking oscillator 38 are applied to a timing circuit 42 designated the $T_2$ resolver to which also are applied signals from the free-running blocking oscillator 30, so that the output of the $T_2$ resolver represents a voltage or current, $T_2$, proportional to the time interval between transmission of an impulse and reception thereof by the receiver 14. While the aircraft computer 44 receiving the two voltages or currents $T_1$ and $T_2$ could compute the value for $\Delta T$ by subtracting voltage $T_2$ from voltage $T_1$, for example, it is considered that greater accuracy for $\Delta T$ is achieved by use of a separate timing circuit 46 designated the $\Delta T$ resolver to which impulses from both blocking oscillator circuits 36 and 38 are applied so that $\Delta T$ is computed by measuring a time interval rather than by subtracting one voltage from another. The value for $\Delta T$ is also fed to the aircraft computer 44. The values for $V_0$, $d$ and B are supplied to the aircraft computer 44 in any suitable manner. For instance, the value for $V_0$ is supplied by applying to a $V_0$ resolver or computer 48 a signal or control influence proportional to free air temperature, on the basis of which the speed of sound is calculated. The value of the distance d may be fixed by design in the computer or fed in by a separate control (not shown), which is also true of the value for B. Any suitable computing circuit or mechanism capable, when fed with the necessary data, of computing the values for angle of attack ($a$) and true airspeed (V) may be used employing well-known computing techniques the nature and details of which need not be described herein since in themselves they constitute no necessary part of the present invention.

It should be emphasized herein that the primary and foremost purpose of the invention is to provide an improved wide-range, versatile and reliable instrument for measuring angle of attack or yaw angle of a high-speed aircraft capable of flying at speeds varying from below Mach 1 to well above Mach 1 and that the ability of the apparatus also, when appropriately designed, to compute the true airspeed is a bonus or supplemental benefit. By appropriate computer function design taking into account the air mass transverse component of relative motion speeds well above Mach 1 may be measured with great accuracy. It is recognized that others heretofore, particularly for marine use, have employed orthogonally arranged transmitters and receivers in order to compute forward speed and side drift speed of vessels, using trigonometric principles; however, those installations are not applicable to the present problem nor have they spurred developments heretofore leading to a solution of the problem of measuring yaw angle or angle of attack of high-speed aircraft. In part, the present invention provides a novel sensor head structure and arrangement of transducers which yields accurate propagation time measurements in undisturbed air mass, and particularly has provided a structure readily compatible with any of various aircraft structural designs. The invention also provides a sonic type device which overcomes the problems mentioned above and others well-known to those working in the field of aircraft instruments inherent in previous types of yaw angle and angle of attack measuring devices. Preferably the three booms or probes 18, 20 and 22 are aligned in a common plane and mounted on a common base which is capable of being accurately bore-sighted with respect to the aircraft longitudinal axis. The entire sensor head is readily designed for minimum aerodynamic drag and the airflow disturbance introduced by the physical structure is negligible. It is to be expected that the most desirable configuration and location for the sensor head will vary with different types and designs of aircraft.

In a typical installation, the free-running blocking oscillator 30 will operate at a frequency of approximately 100 cycles per second and the gated ultrasonic oscillator 26 will be tuned to operate at a frequency of 100 kilocycles per second. The gated oscillator 26 is preferably designed according to well-known considerations so that the first half-cycle of oscillatory energy in each pulse envelope starts at the zero reference value, and is consistently of one polarity or the other (such as positive polarity)—that is, all pulses are phase coherent. This insures that the transit time intervals can be measured to the highest degree of accuracy possible. A pulse width (developed by monostable multivibrator 28) of 500 microseconds is suitable. Because the transmitted pulses are consistently phase coherent, the leading edge of the modulation envelope produced by the detectors in circuits 32 and 34 represents a consistently accurate time reference or marker the inception of which is made is made more pronounced and amplified by the trigger blocking oscillators 36 and 38 in the respective channels.

It will also be recognized that the computer device 44 and the associated resolvers may be either of analog or digital types. Furthermore, it will be apparent that instead of using the pulse technique for measuring propagation time along the respective receiver paths it is possible to measure transit time by a frequency or phase modulation and detection technique, such as by frequency modulating an ultrasonic carrier. Alternatively, an ultrasonic carrier may be amplitude modulated, and the received signal envelopes compared in phase with each other and/or with the transmitted signal envelope in order to determine the time difference on the basis of phase difference, assuming modulation frequency to be known accurately.

Furthermore, it will be recognized that the sensor head 16 may be rotated in order to measure either yaw angle or angle of attack, or that by continuously rotating the sensor head, both may be measured. Alternatively, a single transmitter element, comprising a cluster of transducers, may be employed to cooperate with a cluster of receiving transducers in a stationary sensing head in order to measure angle of air mass relative motion in different planes simultaneously. The principles of the invention may also be applied to wind tunnel test instrumentation and to other applications wherein air mass relative motion is to be measured, especially under conditions wherein conventional equipment of previous types is unsuitable or inadequate.

While the preferred physical arrangement is such that two receiving transducers are spaced equal distances from respectively opposite sides of the axis along which the transmitting element is located, it will be recognized that, with somewhat more elaborate computing circuits, the desired information may be obtained with receiving transducers located in different planes containing the axis of the transmitting transducer and that in the case of an installation for measuring both yaw angle and pitch angle simultaneously it is possible by a triangular arrangement of three receiving transducers to provide information which can also be provided by two pairs of receiving transducers contained in orthogonal planes containing the common transmitter element axis. These variations will be evident without separate illustration herein since they involve well-known trigonometric relationships.

These and other aspects of the invention will be evident to those skilled in the art on the basis of the above disclosure of the invention and its presently preferred embodiments.

I claim as my invention:

1. Aircraft instrument apparatus for measuring air mass relative motion from an aircraft, comprising a sonic energy transmission element, at least two sonic energy receiving elements, a forwardly projecting probe structure mounted on a forward portion of the aircraft and supporting said transmission element on a directional axis extending substantially parallel to the aircraft longitudinal axis at a relative forward location in the undistributed airstream, with such transmitting element being operatively directed generally rearwardly therefrom, means mounting said receiving elements on said aircraft portion also in said undisturbed airstream but aft of the transmission element and spaced equally from different sides of said directional axis each in a desired measurement plane containing said directional axis, each receiving element being spaced from said directional axis by an amount which subtends a small acute angle from the location of the transmission element as an apex, with said receiving elements directed operatively toward said transmission element, transmitter means operable to energize said transmission element, and timing circuit means energized by the receiving elements in response to acoustic energy received thereby from the transmission element and operable to measure difference of propagation time from the transmission element to the respective receiving elements.

2. Aircraft instrument apparatus for measuring air mass relative motion from an aircraft, comprising a base, an elongated forwardly projecting central probe mounted on said base, an acoustic pulse transmitter element mounted on the forward end of said probe directed generally rearwardly thereon from a relative location in the undisturbed airstream, laterally spaced and forwardly projecting side probes mounted on said base adjacent to said central probe on different sides thereof and shorter than said central probe, acoustic pulse receiver elements respectively mounted in spaced apart relationship on the forward ends of said side probes to receive pulse transmissions from said acoustic pulse transmitter element at relative locations in the same undisturbed airstream spaced from different sides of said central probe each by an amount which subtends an acute angle from said acoustic pulse transmitter element as an apex.

3. The apparatus defined in claim 2, wherein said acoustic pulse transmitter element comprises two directional transducers mounted on respectively opposite sides of said central probe in a common measurement plane with said acoustic pulse receiver elements.

4. The method of measuring air mass relative motion from an aircraft, comprising transmitting a compressional ultrasonic pulse into the free airstream from a location on the aircraft in the free airstream, receiving the compressional ultrasonic pulse at a plurality of predetermined locations on the aircraft in the free airstream rearward from the transmitting location, the receiving locations being laterally spaced from each other and from a line through the transmitting location parallel to the heading of the aircraft, measuring the difference of time lapse between such transmission and reception of the compressional ultrasonic pulse at two such receiving locations, and computing said relative motion from such time lapse difference between the received compressional ultrasonic pulse at the two receiving locations.

5. The method defined in claim 4, wherein the receiving locations are spaced equally from different sides of a line substantially intersecting the transmitting location parallel to the heading of the aircraft.

6. Apparatus for measuring air mass relative motion from an aircraft, comprising a transmitter of compressional wave pulse energy mounted on the aircraft in the free airstream, two receivers of such compressional wave pulse energy mounted on the aircraft at predetermined locations in the free airstream displaced rearwardly from the transmitting location, the receiving locations being laterally spaced from each other and from a line through the transmitting location parallel to the heading of the aircraft, timing means operatively associated with said two receivers for measuring the difference of time lapse between transmission of wave pulse energy and reception of such wave pulse energy by said two receivers, and means for computing said air mass relative motion from such time lapse difference at which the wave pulse energy was received at said two receivers from said transmitter.

7. Apparatus for measuring a factor in fluid mass relative motion from a vehicle comprising sonic energy transmitting transducer means, at least two sonic receiving transducer elements, means on the vehicle supporting said transmitting transducer means on a directional axis extending substantially parallel to the vehicle's direction of heading and in the undisturbed fluid stream, means on the vehicle mounting said receiving transducer elements also in said undisturbed fluid stream at respective locations spaced transversely from said directional axis and spaced from each other, with said receiving elements being individually directed operatively toward said transmitting transducer means and spaced therefrom by substantially equal distances measured along said directional axis, transmitter means operable to energize said transmitting transducer means, timing circuit means energized by the receiving transducer elements in response to acoustic energy received thereby from the transmitting transducer means by propagation through the space therebetween, said timing circuit means including apparatus for determining difference of propagation times from the transmitting transducer means to the respective receiving transducer elements, and computer means actuated by the timing circuit means and operable to compute said relative motion factor from said time difference.

8. The apparatus defined in claim 7, wherein the transmitter means comprises a source of recurrent energizing pulses operable to energize the transmitting transducer means recurringly.

9. The apparatus defined in claim 8, wherein the direct line of sight between each receiving transducer element and the transmitting transducer means lies at a small acute angle to the directional axis.

10. The apparatus defined in claim 9, wherein the transmitting transducer means and the receiving transducer elements are mounted on probe means projecting forwardly from a portion of the vehicle.

11. The apparatus defined in claim 10, for measuring direction angle of fluid mass relative motion in a given plane of the vehicle containing said directional axis, wherein the receiving transducer elements are mounted at respective locations spaced transversely from opposite sides of a plane perpendicular to the first-mentioned plane and containing said directional axis.

12. The apparatus defined in claim 10, for measuring velocity of fluid mass relative motion, wherein the receiving transducer elements are mounted at respective locations spaced transversely from opposite sides of a plane perpendicular to a plane containing said directional axis.

References Cited by the Examiner

UNITED STATES PATENTS

| | | | |
|---|---|---|---|
| 2,274,262 | 2/1942 | Wolff | 73—194 |
| 2,534,712 | 12/1950 | Gray | 73—194 |
| 2,569,974 | 10/1951 | Campbell | 73—194 |
| 2,619,836 | 12/1952 | Downing | 73—194 |
| 2,821,083 | 1/1960 | Seliger | 73—180 |
| 2,928,277 | 4/1960 | Cavanaugh et al. | 73—194 |
| 2,949,773 | 8/1960 | Batchelder | 73—194 |

OTHER REFERENCES

Brombacher: "Methods of Measuring Free Air Temperature and Aircraft True Airspeed and Ground Speed," NBS Report #5740, National Bureau of Standards, Washington, D.C., 1958, pages 72–73 relied upon, copy in 73–181.

LOUIS R. PRINCE, *Primary Examiner.*

ROBERT B. HULL, LEO SMILOW, *Examiners.*